ns
3,470,188
9-CYCLOALKYL-LOWER ALKYL-PIPERIDYLI-
DENE DERIVATIVES OF XANTHENES AND
THIOXANTHENES
Carl Kaiser, Haddon Heights, N.J., and Charles L.
Zirkle, Berwyn, Pa., assignors to Smith Kline &
French Laboratories, Philadelphia, Pa., a corporation of Pennsylvania
No Drawing. Filed Jan. 5, 1967, Ser. No. 607,404
Int. Cl. C07d 99/04, 99/06; A61k 25/00
U.S. Cl. 260—293.4
10 Claims

ABSTRACT OF THE DISCLOSURE

Xanthenes and thioxanthenes, optionally ring substituted, having an N-cycloalkyl-lower alkyl-piperidylidene substituent in the 9-position are tranquilizers. These compounds are generally prepared from corresponding N-unsubstituted-piperidylidene derivatives or by reaction of an appropriate xanthone or thioxanthone with a 4-chloro-1-cycloalkyl-lower alkyl-piperidine Grignard reagent.

This invention relates to novel 9-cycloalkyl-lower alkyl-piperidylidene derivatives of xanthenes and thioxanthenes which have useful pharmacodynamic activity, such as tranquilizing activity. For example, compounds of this invention in the standard rat dose range procedure produce responses characteristic of chlorpromazine after oral administration of from 10 to 100 mg./kg.

More specifically the compounds of this invention are represented by the following general structural formula:

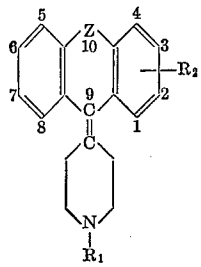

Formula I
wherein:
Z represents oxygen or sulfur, preferably sulfur;
$R_1$ represents cycloalkyl-lower alkyl; and
$R_2$ represents hydrogen, chlorine, bromine, lower alkyl, lower alkoxy, lower alkylmercapto or trifluoromethyl, preferably in position 2.

By the terms lower alkyl and lower alkoxy where used herein alone or as part of a larger moiety, groups having from 1 to 4 carbon atoms, preferably 1 to 2, are indicated. Cycloalkyl where used herein denotes a group having 3 to 6 carbon atoms.

This invention also includes addition salts of the compounds of Formula I formed with pharmaceutically acceptable acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The compounds of this invention are generally prepared as shown in the following synthetic scheme, illustrated by $R_1$ as —$CH_2$-cycloalkyl:

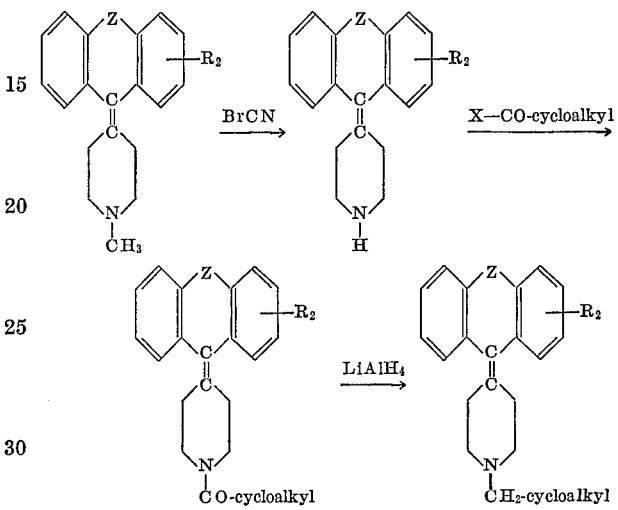

wherein Z and $R_2$ are as defined for Formula I and X is halogen, preferably chlorine or bromine. As outlined above the 9-(1-methyl-4-piperidylidene) derivative is demethylated by reaction with cyanogen bromide followed by acid hydrolysis of the resulting cyanamide. Reaction with a cycloalkyl carbonyl halide gives the corresponding carbonyl derivative which is reduced with a bimetallic hydride to the cycloalkyl-lower alkyl product.

The 9-(1-methyl-4-piperidylidene)-xanthene or -thioxanthene starting materials used as described above are known (U.S. 3,275,640) or are prepared by standard procedures from corresponding xanthones or thioxanthones (U.S. 3,192,204) by reaction with an N-methylpiperidyl magnesium halide in an inert organic solvent such as an ether, for example ethyl ether, dioxane or tetrahydrofuran, at from room temperature to the reflux temperature of the solvent, for from 30 minutes to 4 hours. The 9-hydroxy intermediate thus formed is heated either under reduced pressure or in the presence of acid to give the dehydrated 9-(1-methyl-4-piperidylidene) starting materials for this invention.

The above described process for preparing the 9-(1-methyl-4-piperidylidene) starting materials may be similarly employed as an alternative route to prepare the compounds of Formula I directly by reacting the xanthones or thioxanthones with an $R_1$ substituted piperidyl magnesium halide, followed by dehydration of the corresponding 9-hydroxy intermediates.

The novel compounds of this invention may be administered orally or parenterally in conventional dosage forms such as tablets, capsules, injectables or the like, by incorporating the appropriate dose of a compound of Formula I with carriers according to accepted pharmaceutical practices.

The foregoing is a general description of how to prepare the compounds of this invention. The following examples illustrate the preparation of specific compounds but should not be construed as a limitation of the scope of the invention set forth in Formula I.

EXAMPLE 1

To a suspension of 5.8 g. of magnesium in 10 ml. of tetrahydrofuran is added a solution of 48.3 g. of 4-chloro-1-methylpiperidine in 40 ml. of tetrahydrofuran at a rate to maintain gentle reflux. After addition is complete the mixture is refluxed for one and one-half hours, cooled in an ice-bath and 50.4 g. of 2-trifluoromethylthioxanthone is added in portions. The mixture is refluxed for two and one-half hours, poured into aqueous ammonium chloride and filtered. The solid obtained is suspended in 1 l. of hot water, stirred for 30 minutes and filtered to give 9-hydroxy-9 - (1-methyl-4-piperidyl)-2-trifluoromethylthioxanthene, M.P. 236–238° C.

A mixture of 61 g. of the above 9-hydroxy derivative in 300 ml. of 20% hydrochloric acid is stirred and refluxed for two hours, then concentrated in vacuo. The residue is taken up in 600 ml. of water, extracted with ether, and the aqueous layer made basic. The separated water layer is extracted again with ether and the combined ether extract is dried and concentrated in vacuo to give 9-(1-methyl-4-piperidylidene)-2-trifluoromethylthioxanthene.

To a stirred solution of 2.6 g. of cyanogen bromide in 75 ml. of dry benzene heated at 50–55° C. is added a solution of 7.3 g. of the above 9-piperidylidene derivative in 50 ml. of dry benzene over one and one-half hours. The resulting mixture is stirred and heated at 50–55° C. for four and one-quarter hours. The filtered reaction mixture is extracted with dilute phosphoric acid, dried and concentrated. The residue is taken up in warm acetone and the solution made cloudy by the addition of water. Cooling gives 9-(1-cyano-4-piperidylidene)-2-trifluoromethylthioxanthene, M.P. 156–158° C.

To a mixture of 602 ml. of glacial acetic acid, 398 ml. of water and 62 ml. of concentrated hydrochloric acid is added, with stirring, 30.5 g. of the above cyano derivative. The resulting mixture is stirred and refluxed for 20 hours and then concentrated in vacuo. The residue is treated with water, cooled and filtered to give 9-(4-piperidylidene) - 2 - trifluoromethylthioxanthene hydrochloride, M.P. 298–300° C.; free base, M.P. 128–130° C.

A solution of 1.2 g. of cyclopropane carbonyl chloride in 5 ml. of ether is added to 8.0 g. of the above piperidylidene free base in 15 ml. of benzene and the resulting mixture is stirred at room temperature for one and three-quarter hours. The reaction mixture is then diluted with a large volume of ether, filtered and the filtrate concentrated in vacuo to give 9-(1-cyclopropanecarbonyl-4-piperidylidene)-2-trifluoromethylthioxananthene.

To a stirred suspenison of 3.8 g. of lithium aluminum hydride in ether is added 4.8 g. of the above cyclopropanecarbonylpiperidylidene derivative in ether and the mixture is refluxed for three and one-quarter hours. The reaction mixture is decomposed, filtered and the filtrate concentrated in vacuo to give 9-(1-cyclopropylmethyl-4-piperidylidene) - 2 - trifluoromethylthioxanthene; maleate, M.P. 120–122° C.; hydrochloride, M.P. 228–230° C.

EXAMPLE 2

To 5.9 g. of 9-(4-piperidylidene)-2-trifluoromethylthioxanthene (prepared as in Example 1) in 15 ml. of benzene is added 1.0 g. of cyclobutane carbonyl chloride in 5 ml. of benzene and the resulting mixture is stirred at room temperature for one hour and forty minutes. The reaction mixture is diluted with ether, filtered and the filtrate extracted with dilute hydrochloric acid. The organic layer is washed with water, dried and evaporated to give 9-(1-cyclobutanecarbonyl - 4-piperidylidene)-2-trifluoromethylthioxanthene.

The above cyclobutanecarbonylpiperidylidene derivative (3.2 g.) in ether is added to a stirred suspension of 2.8 g. of lithium aluminum hydride in ether and the resulting mixture is refluxed for three and one-half hours. The reaction mixture is decomposed, filtered and the filtrate concentrated in vacuo to give 9-(1-cyclobutylmethyl - 4-piperidylidene)-2-trifluoromethylthioxanthene; hydrochloride, M.P. 276.5–279° C.

EXAMPLE 3

Employing the general procedures of Example 1 whereby a thioxanthone or xanthone is reacted with the Grignard reagent prepared from 4-chloro-1-methylpiperidine, dehydrated with acid, demethylated with cyanogen bromide, reacted with cyclopropane carbonyl chloride and reduced with lithium aluminum hydride, equimolar quantities of the following starting materials are similarly reacted to give the indicated product:

thioxanthone gives 9-(1-cyclopropylmethyl-4-piperidylidene)-thioxanthene;
xanthone gives 9-(1-cyclopropylmethyl-4-piperidylidene)-xanthene;
2-trifluoromethylxanthone gives 9-(1-cyclopropylmethyl-4-piperidylidene)-2-trifluoromethylxanthene;
2-chlorothioxanthone gives 9-(1-cyclopropylmethyl-4-piperidylidene)-2-chlorothioxanthene;
2-bromothioxanthone gives 9-(1-cyclopropylmethyl-4-piperidylidene)-2-bromothioxanthene;
2-methylxanthone gives 9-(1-cyclopropylmethyl-4-piperidylidene)-2-methylxanthene;
2-methoxyxanthone gives 9-(1-cyclopropylmethyl-4-piperidylidene)-2-methoxyxanthene; and
2-methylmercaptothioxanthone gives 9-(1-cyclopropylmethyl - 4 - piperidylidene) - 2 - methylmercaptothioxanthene.

EXAMPLE 4

To a suspension of 5.8 g. of magnesium in 10 ml. of tetrahydrofuran is added a solution of 77.2 g. of 4-chloro-1-cyclopentylethylpiperidine in 100 ml. of tetrahydrofuran and the resulting mixture is refluxed for four hours. The mixture is then cooled, 50.4 g. of 2-trifluoromethylthioxanthone is added in portions and refluxed for three hours. The reaction mixture is treated with aqueous ammonium chloride and filtered to give 9-hydroxy-9-(1-cyclopentylethyl - 4 - piperidyl) - 2 - trifluoromethylthioxanthene.

A mixture of 73.8 g. of the above 9-hydroxy derivative in 350 ml. of 20% hydrochloric acid is stirred and refluxed for two hours, then concentrated in vacuo. The residue is taken up in 700 ml. of water, extracted with ether and the aqueous layer made basic. The separated water layer is extracted again with ether and the combined ether extract is dried and concentrated in vacuo to give 9 - (1-cyclopentylethyl-4-piperidylidene)-2-trifluoromethylthioxanthene.

Similarly, employing in the above reaction sequence 82.3 g. of 4-chloro-1-cyclohexylethylpiperidine there is obtained the corresponding 9-(1-cyclohexylethyl-4-piperidylidene)-2-trifluoromethylthioxanthene product.

What is claimed is:
1. A chemical compound selected from the group consisting of a free base and pharmaceutically acceptable salts thereof, said free base having the formula:

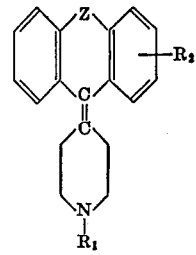

in which:
Z is oxygen or sulfur;
R₁ is cycloalkyl-lower alkyl; and
R₂ is hydrogen, chlorine, bromine, lower alkyl, lower alkoxy, lower alkylmercapto or trifluoromethyl;
said cycloalkyl term having 3 to 6 carbon atoms and said lower alkyl and lower alkoxy terms having 1 to 4 carbon atoms.

2. A chemical compound in accordance with claim 1 in which Z is sulfur.

3. A chemical compound in accordance with claim 2 in which $R_2$ is in the 2-position.

4. A chemical compound in accordance with claim 3 in which $R_2$ is 2-trifluoromethyl.

5. A chemical compound in accordance with claim 4 in which $R_1$ is cyclopropylmethyl, being the compound 9 - (1 - cyclopropylmethyl-4-piperidylidene)-2-trifluoromethylthioxanthene.

6. A chemical compound in accordance with claim 4 in which $R_1$ is cyclobutylmethyl, being the compound 9 - (1 - cyclobutylmethyl - 4-piperidylidene)-2-trifluoromethylthioxanthene.

7. A chemical compound having the formula:

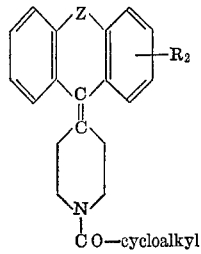

in which:
Z is oxygen or sulfur; and
$R_2$ is hydrogen, chlorine, bromine, lower alkyl, lower alkoxy, lower alkylmercapto or trifluoromethyl;
said cycloalkyl moiety having 3 to 6 carbon atoms and said lower alkyl and lower alkoxy terms having 1 to 4 carbon atoms.

8. A chemical compound in accordance with claim 7 in which Z is sulfur.

9. A chemical compound in accordance with claim 8 in which $R_2$ is 2-trifluoromethyl.

10. A chemical compound in accordance with claim 9 in which cycloalkyl is cyclopropyl, being the compound 9 - (1-cyclopropanecarbonyl-4-piperidylidene)-2-trifluoromethylthioxanthene.

References Cited

UNITED STATES PATENTS

| | | | |
|---|---|---|---|
| 3,055,903 | 9/1962 | Renz et al. | 260—293.44 |
| 3,192,204 | 6/1965 | Craig et al. | 260—293.44 |
| 3,275,640 | 9/1966 | Engelhardt et al. | 260—293.44 |

OTHER REFERENCES

Organic Chemistry, Fieser & Fieser, 3rd ed., 1956, pp. 46–47.

HENRY R. JILES, Primary Examiner

S. D. WINTERS, Assistant Examiner

U.S. Cl. X.R.

260—256, 294, 294.7, 999